(12) United States Patent
Kielbowicz

(10) Patent No.: US 7,822,164 B1
(45) Date of Patent: Oct. 26, 2010

(54) PROTECTIVE SCREEN FOR THE SCREENING OFF OF A SUCTION SPACE

(75) Inventor: Stanislaw Kielbowicz, Waedenswil (CH)

(73) Assignee: CCI AG, Winterthur (CH)

( * ) Notice: Subject to any disclaimer, the term of this patent is extended or adjusted under 35 U.S.C. 154(b) by 0 days.

(21) Appl. No.: 10/780,802

(22) Filed: Feb. 17, 2004

(30) Foreign Application Priority Data

Jan. 29, 2004 (EP) ................................. 04405055

(51) Int. Cl.
*G21C 19/42* (2006.01)
(52) U.S. Cl. ...................... 376/313; 376/282; 376/299; 210/484
(58) Field of Classification Search .................. 367/282, 367/305, 309, 310, 313; 376/313; 210/416.1, 210/232, 167, 484
See application file for complete search history.

(56) References Cited

U.S. PATENT DOCUMENTS

| | | | | | |
|---|---|---|---|---|---|
| 3,326,382 | A | * | 6/1967 | Bozek et al. ................. | 210/356 |
| 4,049,406 | A | * | 9/1977 | Rivers .......................... | 96/129 |
| 4,225,328 | A | * | 9/1980 | Stiehl .......................... | 55/378 |
| 4,376,091 | A | * | 3/1983 | Netkowicz et al. ........... | 376/283 |
| 5,080,699 | A | * | 1/1992 | Ho et al. ...................... | 96/129 |
| 5,283,812 | A | * | 2/1994 | Verdier ....................... | 376/352 |
| 5,483,564 | A | * | 1/1996 | Matzner et al. ............. | 376/352 |
| 5,705,054 | A | * | 1/1998 | Hyrsky ........................ | 210/109 |
| 5,759,389 | A | * | 6/1998 | Fernando et al. ........... | 210/198.1 |
| 5,759,398 | A | * | 6/1998 | Kielbowicz .............. | 210/416.1 |
| 5,759,399 | A | * | 6/1998 | Bilanin et al. ............ | 210/416.1 |
| 5,867,551 | A | * | 2/1999 | Toshihiko .................... | 376/352 |
| 6,491,818 | B2 | * | 12/2002 | Dwyer et al. ................ | 210/315 |
| 7,211,190 | B2 | * | 5/2007 | Kielbowicz .................. | 210/232 |
| 2003/0196950 | A1 | | 10/2003 | Kraft | |

FOREIGN PATENT DOCUMENTS

CH 689687 A5 8/1999
DE 3004682 A1 * 8/1981

OTHER PUBLICATIONS

U.S. Nucear Regulatory Commission. Regulatory Guide 1.82. Revision 3. Nov. 2003. Available through Electronic Reading Room at www.nrc.gov.*
Process and Means for Removing Sludges From Industrial and Domestic Settling Pits or Similar Facilities; english translation DE 3004682, USPTO, 2006.*
Merriam-Webster collegiate dictionary.—10th edit., 1998; p. 978.*

* cited by examiner

*Primary Examiner*—Rick Palabrica
(74) *Attorney, Agent, or Firm*—Townsend and Townsend and Crew, LLP

(57) ABSTRACT

A protective screen for the screening off of a suction space and a suction duct connected to it in a cooling system, include at least one screen wall element which has a suction side and an outflow side. The screen wall element is built up from a plurality of modular rectangular cassette units, which respectively contain a plurality of suction pockets open towards the suction side, with the screen pockets being surrounded by outflow gaps which are open towards the outflow side.

14 Claims, 5 Drawing Sheets

PROTECTIVE SCREEN FOR THE SCREENING OFF OF A SUCTION SPACE

BACKGROUND OF THE INVENTION

The invention relates to a protective screen for the screening off of a suction space and of a suction duct connected to it.

A reactor in a nuclear power plant is surrounded by a safety container of concrete and steel, the so-called containment. Furthermore, the reactor is equipped with an emergency cooling system (termed Emergency Core Cooling or ECC in English) in order to cool the reactor core in the event of a malfunction or incident. In such a case the water is sucked in from the lowermost part of the safety container, the so-called sump, by emergency cooling pumps via suction ducts and circulated through the reactor core.

In the design scenario for the emergency cooling system it is assumed that insulation debris and chunks of concrete which arise in an incident can fall down into the sump and/or be washed down into the sump by the downwardly flowing water. In order that the debris do not impair the ability of the emergency cooling system to operate, special screen elements, referred to as protective screens herein, are provided in front of the inlet openings of the suction ducts which lead to the emergency cooling pumps. These protective screens have the task of keeping back the debris resulting from the incident and simultaneously ensuring an adequate through-flow of water. In this connection it must be ensured that the pressure drop caused by the debris does not exceed the permissible limiting value.

Previously known protective screens used in nuclear power plants with pressure water reactors (PWR) are mainly formed as flat grid segments which have only a small screen surface and which in the event of contamination with fibrous debris materials produce an impermissibly high pressure drop. Protective screen elements of corrugated and perforated sheet metal offer a larger effective screen area. However, deformations occur under pressure loading which restrict the size of such protective screen elements. A cylindrical suction screen is described in EP 0 818 227 A1 which admittedly has a very large effective screen area but can only be used in rare cases in the sump region of a PWR nuclear power plant, because the direct environment of the inlet openings of the suction ducts is constructed in such a way that it is unsuitable for the use of cylindrical suction screens. A suction space for the installation of protective screen elements with a suitable screen area is mainly provided in front of the inlet openings of the suction ducts. For space reasons the suction space in the sump region of a PWR nuclear power plant is, on average, relatively shallow.

SUMMARY OF THE INVENTION

An object of the present invention is to make available a protective screen the effective screen area of which is substantially larger, for example several times larger, than the area which results from the external dimensions and which can be used for the screening off of the suction space and of a suction duct connected to it in the sump region of a PWR nuclear power plant.

This object is satisfied with the protective screen described in accordance with the embodiments of the present invention. The protective screen in accordance with the invention for the screening off of the suction space and of the suction duct connected thereto, in particular of a suction space and a suction duct in an emergency cooling system of a nuclear power plant, includes at least one screen wall element which has a suction side and an outflow side. The screen wall element is built up from one or more modular rectangular (or four-cornered) cassette units, with the cassette units each containing a plurality of suction pockets open towards the suction side, wherein the screen pockets are surrounded by outflow gaps, the outflow gaps being connected to the outflow side or open towards the outflow side.

The cassette units can preferably be placed in a row, for example in one direction in order to assemble the screen wall element in the desired size.

The screen pockets are preferably each surrounded on four sides by outflow gaps.

In a preferred embodiment the cassette units contain spaced-apart walls and/or intermediate walls and bent perforated wall segments, in particular essentially U-shaped, bent, perforated wall segments between the walls and/or the intermediate walls in order to form suction pockets. A plurality of U-shaped bent wall sections can advantageously be formed in an elongate, meander-shaped part. The walls and/or the intermediate walls of the cassette units are preferably formed as double walls and/or outflow gaps. The suction pockets preferably have a depth of greater than 0.1 m, in particular greater than 0.2 m.

In a preferred embodiment the walls and/or the intermediate walls of the cassette units are clamped against one another by connection elements such as for example bolts or pins. The spacing between two walls and/or intermediate walls and/or the spacing between the two sides of a double wall is preferably determined by spacer elements.

In a further preferred embodiment the walls and/or the intermediate walls and/or the U-shaped bent wall segments are manufactured from perforated, preferably pierced sheet metal.

The protective screen in accordance with the invention has the advantage that relatively large area and comparatively shallow screen wall elements can be assembled with the cassette units. I.e. the length and width of the screen wall elements can be selected in a wide range, while the thickness is typically significantly smaller in comparison to the length and/or width. Furthermore, it is possible to assemble a plurality of screen wall elements into a larger protective screen and/or a protective screen with a complex shape. Thus, the protective screens in accordance with the invention are particularly suited for the screening off of the suction space and of a suction duct connected to it in the sump region of a PWR nuclear power plant, where suction spaces of different sizes have to be screened off and the height which is available is restricted.

The protective screen in accordance with the invention is particularly suited for the retro-fitting to existing plants in which the protective screen with an inadequate screen area is intended to be replaced or has to be replaced by a protective screen with a larger effective screen area. It is particularly advantageous that the pocket-like design of the screen surface enables a penetration flow which can flow away in five directions. The protective screens in accordance with the invention typically have an effective screen area which is five to twenty times larger than a protective screen consisting of a planar screen surface with corresponding outer dimensions. Thanks to the larger effective screen area, the debris and materials which cover the screen area and the water penetration speed give rise to a substantially lower through-flow resistance, so that the pressure drop which arises across the protective screen is correspondingly reduced.

A further advantage of the protective screen in accordance with the invention is the pressure loadability of the screen wall elements assembled from the cassette units. The walls and intermediate walls respectively of the cassette units which are held under stress and the limbs of the U-shaped bent wall segments form a grid-like network of reinforcing ribs so that the cassette units have a high degree of shape stability and can be loaded with a higher pressure than, for example, a corrugated sheet metal of corresponding size.

Further advantageous embodiments can be understood from the following description taken in conjunction with the accompanying drawings.

DESCRIPTION OF THE PREFERRED EMBODIMENTS

Figure 1:
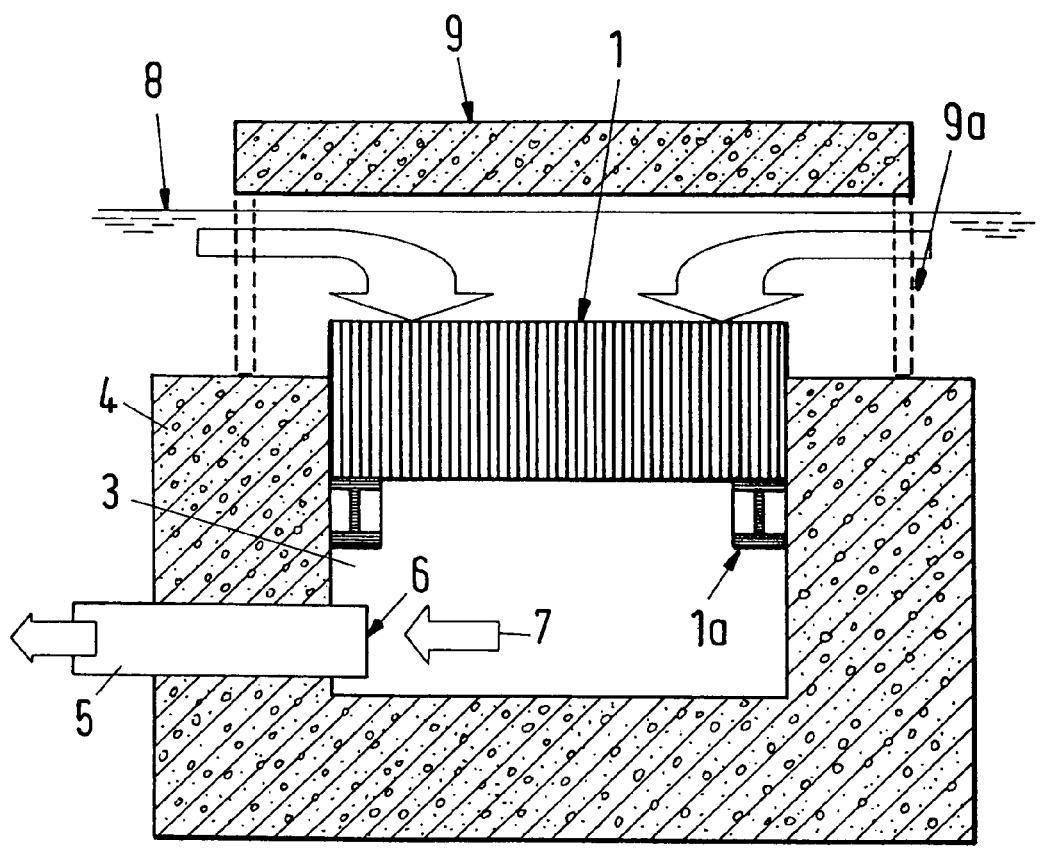
FIG. 1 is a section through an embodiment of a suction position with a protective screen in accordance with the present invention.

FIG. 1 shows a section through an embodiment of a suction position for cooling water, in particular a suction position in the sump region of a nuclear power plant, in particular of a PWR power plant. In the embodiment, a protective screen 1 in accordance with the present invention is arranged above a suction space 3 which is connected by a suction duct 5 to a pump, which is not shown in FIG. 1. A suction flow 7 produced by the pump out of the suction space 3 passes into an inlet opening 6 of the suction duct 5 arranged in the suction space. The suction space 3 is bounded towards the top by the protective screen 1 and in the other directions by a wall 4, which can for example consist of concrete. The protective screen 1 screens the suction space 3 off from the top and prevents debris and disturbing parts, such as for example pieces of insulation materials, which are carried along by the cooling water from being able to enter into the suction space 3 and the suction line 5. Support elements 1a are provided in the upper part of the suction space 3 on which the protective screen 1 is arranged. They can for example consist of steel sections, such as for example angle sections, T-sections or H-sections.

In the embodiment the protective screen 1 and the suction space 3 are arranged below a water level 8 which covers over the sump region of a safety container not shown in FIG. 1. A protective roof 9 is provided in the embodiment above the protective screen 1 and spaced from it. The protective roof protects sidewise beyond the protective screen in order to protect the protective screen from mechanical damage. Furthermore debris rakes 9a are provided in the inlet region to the side of the protective screen 1 between the protective roof 9 and the wall 4 in order to keep back larger pieces of debris.

Figure 2:
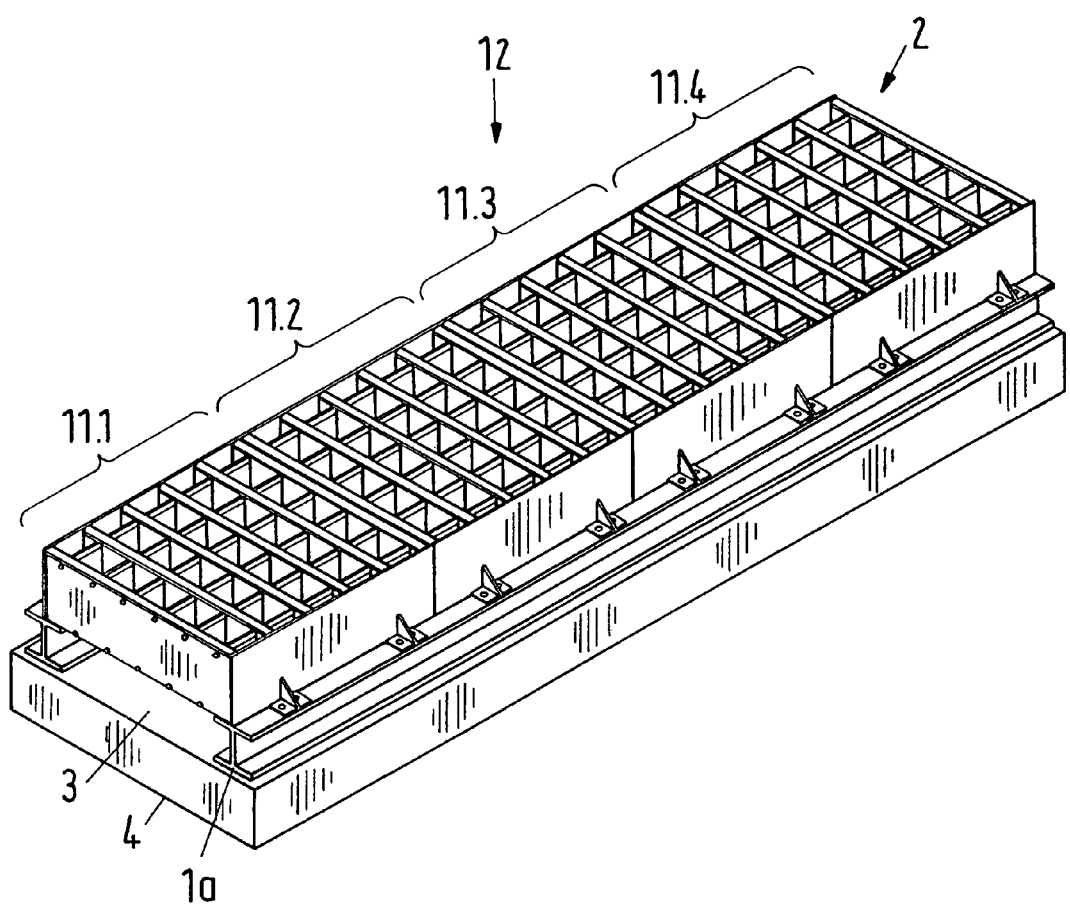
FIG. 2 is a perspective view of a further embodiment of a suction position with a screen wall element of a protective screen in accordance with the present invention.

FIG. 2 shows a further embodiment of a suction position with a screen wall element of a protective screen in accordance with the present invention seen in a perspective view.

The screen wall element 2 is assembled from four modular rectangular cassette units 11.1-11.4 which are arranged sidewise in a row in one direction. It should be noted that the number and the arrangement of the cassette units can be varied in order to assemble screen wall elements of the desired size. The layout of the cassette units 11.1-11.4 is explained in more detail in the following sections. The screen wall element 2 has a suction side 12 and an outflow side which is not visible in the present perspective view. The screen wall element 2 is arranged above a suction space 3 which is formed on one side by the screen wall element 2 and on the opposite side by a wall element 4 which can for example be a concrete plate. A base plate of a safety container, or a different constructional part at or in the safety container of a nuclear power plant, can also be used as the wall element 4. In the embodiment two parallel beams and/or spacer elements 1a are arranged on the wall element 4 on which the screen wall element 2 is secured. The beam elements or spacer elements, which can for example be executed as H-like steel sections, serve simultaneously as a lateral boundary for the suction space 3.

In FIG. 2 the suction space 3 is shown open in the two remaining directions, so that the construction of the suction position can be better recognized. In order to complete the construction the suction space 3 must be closed at the open sides by means of wall elements and must in addition be correspondingly lengthened if the inlet opening of the suction duct is located outside the region shown.

In a preferred embodiment a plurality of boundary surfaces of a suction space are screened off by means of screen wall elements. In this manner it is, for example, possible to form a suction body, or a screen body, which is matched to the constructional environment.

Figure 3:
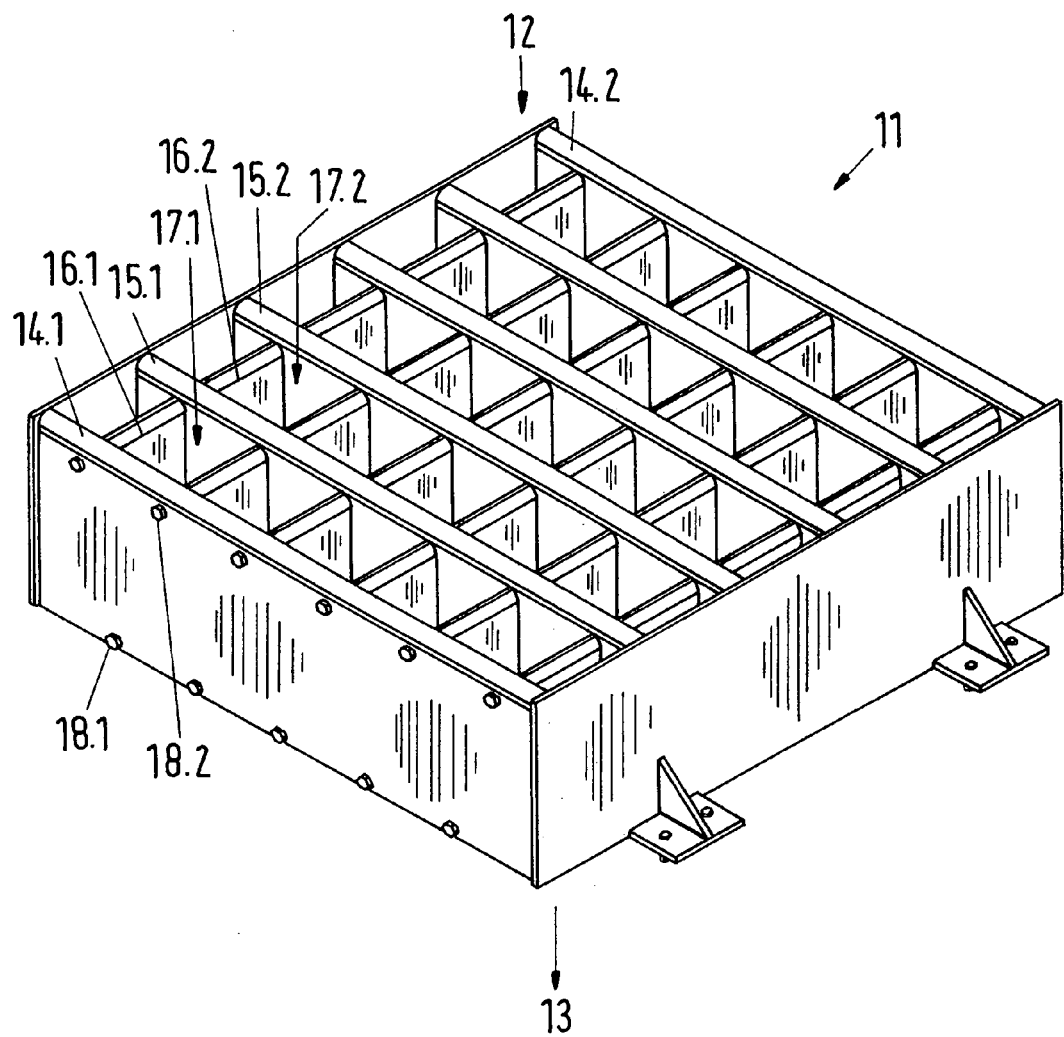
FIG. 3 is a perspective view of a cassette unit of the embodiment shown in FIG. 2.

FIG. 3 shows a perspective view of a cassette unit of the embodiment shown in FIG. 2. The cassette unit 11 has a suction side 12 and an outflow side 13 and includes outer walls 14.1, 14.2 and, depending on the requirements, one or more intermediate walls 15.1, 15.2, the outer walls and intermediate walls being arranged spaced from one another. Furthermore the cassette unit 11 includes bent and perforated wall segments 16.1, 16.2 between the outer wall 14.1, 14.2 and intermediate walls 15.1, 15.2 respectively in order to form suction pockets 17.1, 17.2. The bent wall segments can for example be U-shaped, V-shaped or similarly shaped. Advantageously, wall segments 16.1, 16.2 arranged in a row are formed as elongate meandering parts. The walls 14.1, 14.2 and/or intermediate walls 15.1, 15.2 and/or the bent wall segments (16, 16.1, 16.2) are preferably manufactured from perforated sheet metal. The diameter of the perforation holes typically lies in the range from 1 to 10 mm, preferably from 2 to 5 mm. The suction pockets 17.1, 17.2 preferably have a depth of greater than 0.1 m, in particular greater than 0.2 m. The walls 14.1, 14.2 and/or intermediate walls 15.1, 15.2 are connected and clamped together in the embodiment by means of connection elements 18.1, 18.2.

Figure 4:
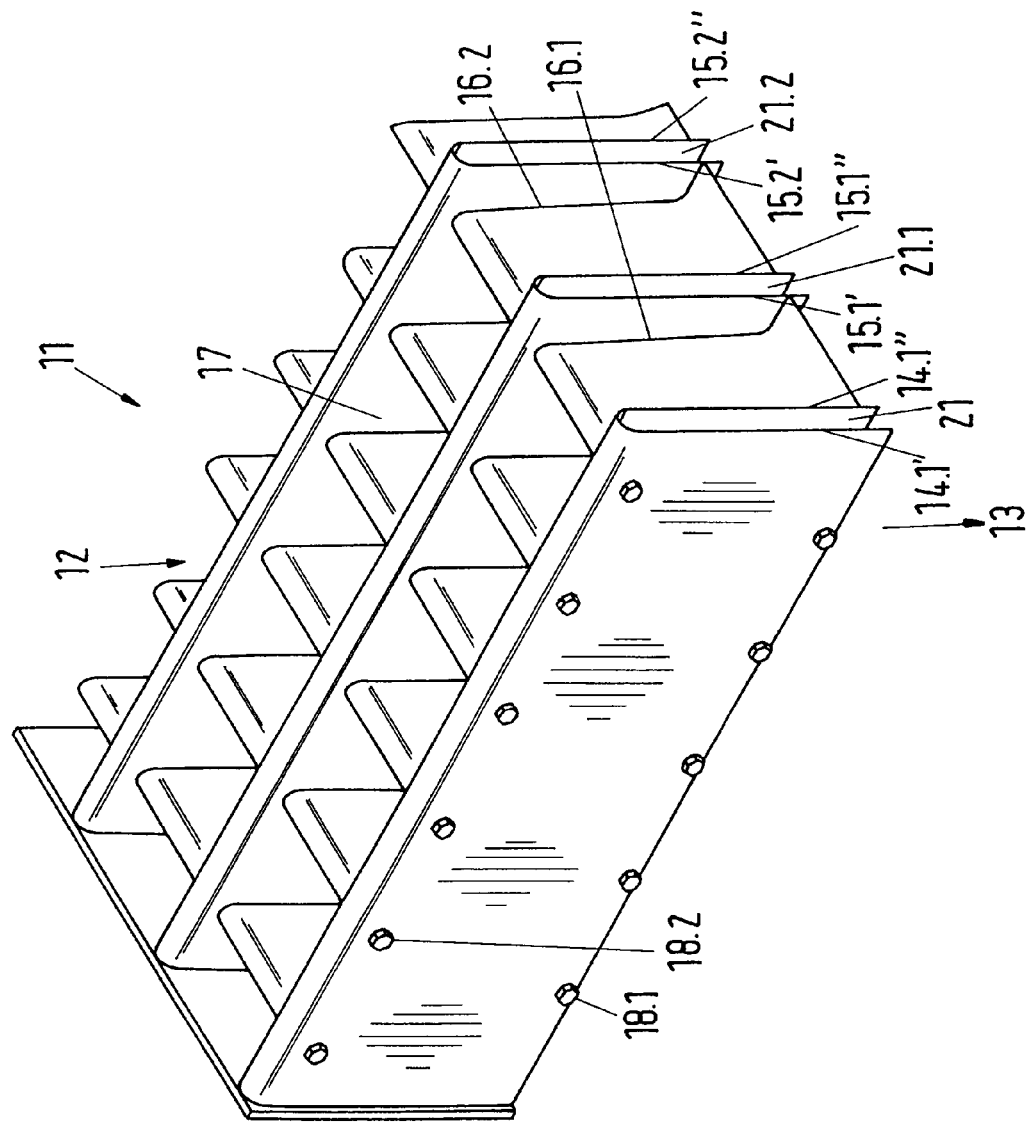
FIG. 4 is an enlarged section of an embodiment of a variant of the cassette unit shown in FIG. 3.

FIG. 4 shows an enlarged section of an embodiment of the cassette unit shown in FIG. 3 in a perspective view. In this variant the walls and/or intermediate walls of the cassette units 11 are perforated and formed as double walls 14.1', 14.1", 14.2', 14.2", 15.1', 15.1", 15.2', 15.2". The double walls are preferably closed off towards the suction side and open to the outflow side so that they form outflow gaps 21, 21.1, 21.2. Due to the double walls, the suction pockets 17 are surrounded on at least two sides by the named outflow gaps 21, 21.1, 21.2 through which the water flowing out of the suction pocket into the double walls can flow away.

Figure 5A:
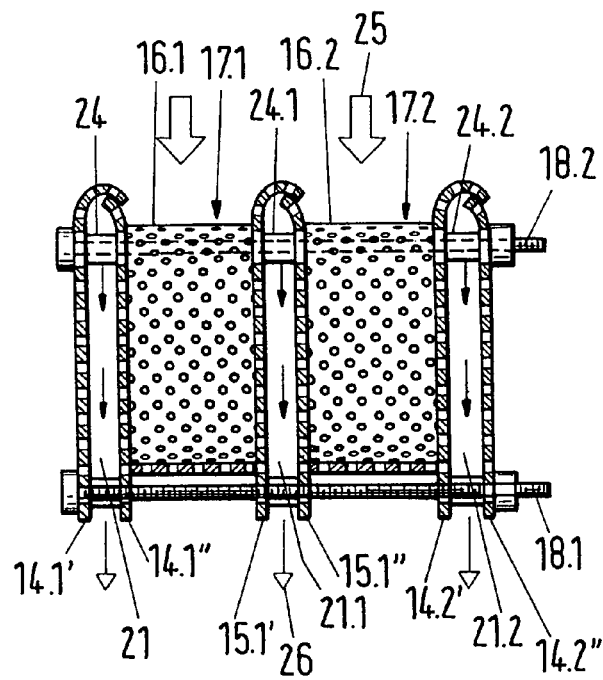
FIG. 5a is a cross-section through two adjacently disposed suction pockets in accordance with a further variant.

FIG. 5a shows a cross-section through two suction pockets lying alongside one another in accordance with a further variant of the present invention. The walls and the intermediate walls are likewise executed in this variant as double walls 14.1', 14.1", 14.2', 14.2", 15.1', 15.1". The double walls are for example each formed from two, perforated, spaced-apart wall parts which are designed so that the double walls are closed off towards the suction side whereas they are open towards the outflow side. Respective, perforated, U-shaped, bent wall segments 16.1, 16.2 are arranged between double walls 14.1', 14.1", 14.2', 14.2", 15.1', 15.1" and form suction pockets 17.1, 17.2 together with the double walls. The double walls serve in this arrangement as lateral outflow gaps 21, 21.1, 21.2 through which lateral penetration flows can flow away out of the suction pockets. The reference numeral 25 thereby designates the suction side inflow direction and the reference numeral 26 the outflow direction. Further penetration flows out of the suction pockets flow through the perforated, U-shaped, bent wall segments 16.1, 16.2. The double walls 14.1', 14.1", 14.2', 14.2", 15.1', 15.1" and/or the wall parts of the same are connected by means of connection elements 18.1, 18.2, which can for example be formed as screws, threaded bolts or pins, and can be clamped against one another. The mutual spacing of the wall parts in the double walls can for example be fixed by spacer elements 24, 24.1, 24.2, while the distance between the double walls is determined by the perforated, U-shaped, bent wall segments 16.1, 16.2.

Figure 5C:
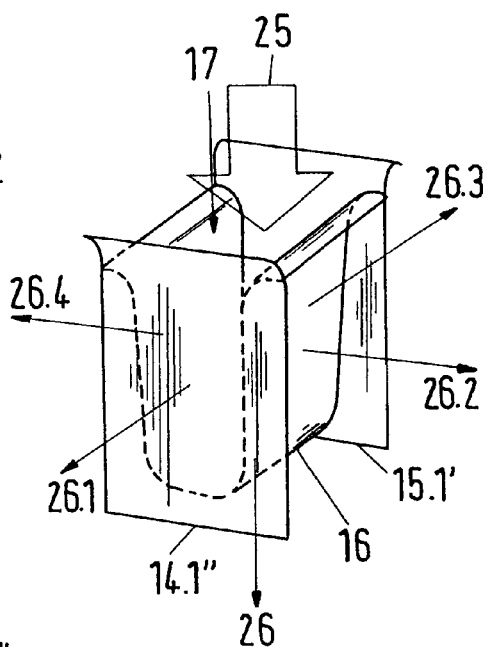
FIG. 5b is a longitudinal section through a row of suction pockets in accordance with the variant shown in FIG. 5a, and FIG. 5c is a perspective view of a suction pocket in accordance with the variant shown in FIGS. 5a and 5b with marking of the outflow directions of the penetration flows.
Figure 5B:
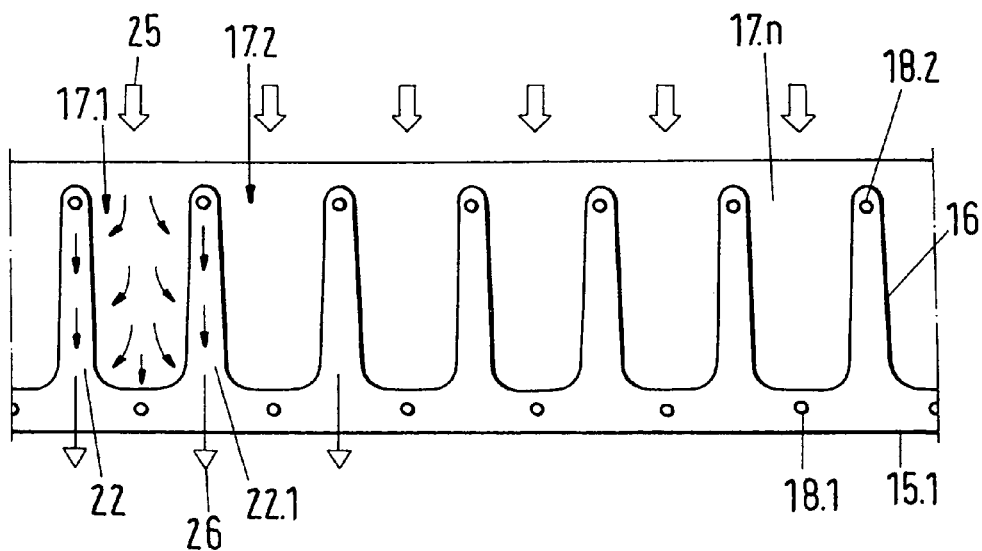

FIG. 5b shows a longitudinal section through a row of suction pockets in accordance with the variant shown in FIG. 5a. A row of perforated U-shaped bent wall segments are formed in an elongate-shaped meandering part 16. This part can be favorably manufactured by bending operations, for example from perforated sheet metal. In the meandering part 16 outflow gaps 22, 22.1 are formed between the U-shaped bent wall segments which are closed towards the suction side and open towards the outflow side. The reference numeral 25 thereby designates the suction side inflow direction and the reference numeral 26 the outflow direction. The U-shaped bent wall segments, together with the walls or double walls 15.1, form the suction pockets 17.1, 17.2, 17.*n*.

The suction pockets in accordance with the variant shown in FIGS. 5a and 5b have the advantage that they are surrounded on four sides by outflow gaps 22, 22.1, 21.2, 21, 21.1. In addition, the penetration flow which is sucked through the base of the suction pockets can flow away direct to the outflow side; i.e. the outflow of the penetration stream from the suction pockets takes place to all sides without disturbing resistance. FIG. 5c shows a perspective view of such a suction pocket 17 with a marking of the outflow directions 26, 26.1, 26.2, 26.3, 26.4 of the penetration flows.

In comparison to planar protective screens of conventional construction the protective screens in accordance with the present invention have a substantially larger effective screen area for the same length and width. Debris and materials which cover the suction surface thus cause a substantially lower through-flow resistance, so that the pressure drop which arises across this protective screen of the invention is correspondingly reduced. A further advantage of the protective screen in accordance with the invention is the comparatively high shape stability and ability to be loaded with pressure as well as the robust structure which facilitates installation work and repair work.

The invention claimed is:

1. A protective screen for screening off a suction space and a suction duct connected to it, in an emergency cooling system of a nuclear power plant, said protective screen including at least one screen wall element having a suction side and an outflow side,
   wherein the screen wall element is built up of one or more modular cassette units for screening off a suction space and a suction duct connected to it in an emergency cooling system of a nuclear power plant, wherein the cassette units have rectangular sides,
   wherein the cassette units each contain:
   a plurality of screen pockets formed into rows which are open towards the suction side and which extend between two opposed rectangular sides of the cassette,
   two elongated lateral walls which extend between said two opposed rectangular sides of the cassette and which form lateral sides of the cassette, each lateral wall being formed from perforated sheet metal, and
   one or more elongated intermediate walls arranged between the lateral walls and formed as double walls with the double walls being open towards the outflow side, each intermediate wall extending between said two opposed rectangular sides of the cassette and being formed from perforated sheet metal, with the lateral walls and the one or more intermediate walls forming the lateral sides of the screen pocket rows,
   wherein each screen pocket is formed from an elongate portion of perforated sheet metal that is bent into a longitudinal valley, said longitudinal valley being transverse to the elongated lateral walls and the one or more intermediate walls, and said bent, elongate portion of perforated sheet metal spanning the distance between two consecutive intermediate walls or between one of the elongated lateral walls and an adjacent intermediate wall, with the screen pocket being open towards the suction side over said distance, and each screen pocket row has outflow gaps between said valleys on the outflow side, said outflow gaps being connected to the outflow side or open toward the outflow side,
   and wherein the cassette units are modularly configurable for placement in a row in order to assemble the screen wall element in the desired size.

2. A protective screen in accordance with claim 1, wherein the longitudinal valley comprises a substantially U-shaped form.

3. A protective screen in accordance with claim 1, wherein the screen pockets have a depth of greater than 0.1 m.

4. A protective screen in accordance with claim 1, wherein the spaced apart walls and the intermediate walls of the cassette units are clamped against one another by means of connection elements.

5. A protective screen in accordance with claim 1, wherein the suction pockets have a depth of greater than 0.2 m.

6. A protective screen in accordance with claim 1, wherein any of the spacings between the two sides of a double wall are determined by spacer elements disposed between the two sides of the double wall.

7. A protective screen in accordance with claim 1, wherein any of the spacings between the intermediate walls are determined by spacer elements disposed between the intermediate walls.

8. A protective screen in accordance with claim 1, wherein the plurality of screen pockets are directly open to, and in direct contact with, the suction side.

9. A protective screen in accordance with claim 8, wherein a pressure drop between the suction side and outflow side is determined by an effective screen area of the plurality of screen pockets.

10. A protective screen in accordance with claim 9, wherein the effective screen area comprises a flow-though resistance of the plurality screen pockets.

11. A protective screen in accordance with claim wherein the suction duct is located in a height restricted sump region.

12. A protective screen in accordance with claim 1, wherein the outflow gaps are closed to the suction side.

13. A protective screen in accordance with claim 1, wherein the plurality of screen pockets are structurally configured to supply water to the emergency cooling system of a nuclear power plant when material resultant from an incident is impinged against the plurality of screen pockets.

14. A protective screen in accordance with claim 13, wherein the material comprises concrete chunks and/or insulation debris.

* * * * *